(12) United States Patent
Ishikawa et al.

(10) Patent No.: US 6,343,284 B1
(45) Date of Patent: Jan. 29, 2002

(54) METHOD AND SYSTEM FOR BILLING ON THE INTERNET

(75) Inventors: Norihiro Ishikawa; Toshihiko Suguri; Masuo Yoshimoto, all of Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 09/206,134

(22) Filed: Dec. 7, 1998

(30) Foreign Application Priority Data

Dec. 8, 1997 (JP) .............................................. 9-337393

(51) Int. Cl.[7] .............................................. G06F 17/60

(52) U.S. Cl. ............................ 705/67; 705/44; 705/52; 705/72; 705/77; 705/78; 705/79; 713/168; 713/176; 713/185

(58) Field of Search .............................. 705/40, 44, 39, 705/53, 52, 65, 67, 72; 235/379, 380; 379/114, 144; 902/1, 26; 713/183, 184, 185

(56) References Cited

U.S. PATENT DOCUMENTS

| | | | | |
|---|---|---|---|---|
| 4,517,412 A | * | 5/1985 | Newkirk et al. | ............. 379/144 |
| 4,684,791 A | * | 8/1987 | Bito | ............ 235/380 |
| 5,371,797 A | * | 12/1994 | Bocinsky, Jr. | ................ 380/24 |

(List continued on next page.)

FOREIGN PATENT DOCUMENTS

| | | |
|---|---|---|
| JP | 9-251494 | 9/1997 |
| WO | WO96/15 616 | 5/1996 |
| WO | WO96/41 445 | 12/1996 |
| WO | WO97/29 584 | 8/1997 |
| WO | WO 97/40 615 | 10/1997 |

OTHER PUBLICATIONS

Abadi, et al., "Authentication and Delegation with Smart–cards", SRC Research Report 67, 'Online! No. 67, Oct. 22, 1990–Jul. 30, 1992 XP002137406 Retrieved from the Internet: URL:ftp://ftp.digital.com/pub/DEC/SRC/research–reports/SRC–067.pdf retrieved on May 10, 2000, abstract, p. 1, line 1–p. 3, line 9, p. 4, line 18–p. 4, line 34, p. 12, line 13–p. 13, last line, p. 17, line 1–line 32.

Sirbu, M., et al., "Netbill: An Internet Commerce System Optimized for Network–Delivered Services", IEEE Personal Communications, US, IEEE Communications Society, vol. 2, No. 4, Aug. 1, 1995 pp. 34–39, XP000517588, ISSN: 1070–9916, p. 34, col. 1, line 16–p. 36, col. 2, line 3, p. 38, col. 2, line 32–p. 39, col. 1, line 64.

C. Whaley, "Payments Systems, Bill Payment and Presentment", Payments Systems, Bill Payment and Presentment, XX, XX, Jul. 8, 1997 pp. 1–32, XP002914888, figures 1,2, p. 9, line 1–p. 18, last line, p. 21, line 1–p. 29, last line.

*Primary Examiner*—Tariq R. Hafiz
*Assistant Examiner*—Romain Jeanty
(74) *Attorney, Agent, or Firm*—Kenyon & Kenyon

(57) ABSTRACT

The present invention discloses an Internet billing method which can reject invalid orders with reliability, and which can be used without a credit card. In the present invention, a terminal makes a request of a content server for a chargeable service by using a prepaid information medium which has predetermined information necessary for transactions. After the request, the content server makes a request of a prepaid information management server for authentication to check whether the prepaid information medium is authorized to be used for the chargeable service, and for billing for the prepaid information medium. Then, the prepaid information management server authenticates the prepaid information medium and performs the billing for the prepaid information medium on the basis of usage of the chargeable service. If the authentication and the billing succeed, the content server provides the chargeable service to the terminal.

13 Claims, 9 Drawing Sheets

U.S. PATENT DOCUMENTS

| | | | | |
|---|---|---|---|---|
| 5,502,765 | A | * | 3/1996 | Ishiguro et al. ............... 380/24 |
| 5,539,825 | A | * | 7/1996 | Akiyama et al. ............. 380/24 |
| 5,590,199 | A | * | 12/1996 | Krajewski, Jr. .............. 380/24 |
| 5,704,046 | A | * | 12/1997 | Hogan ......................... 705/26 |
| 5,770,844 | A | * | 6/1998 | Henn .......................... 235/380 |
| 5,809,143 | A | * | 9/1998 | Hughes ....................... 380/24 |
| 5,809,144 | A | * | 9/1998 | Sirbue et al. ................. 705/53 |
| 5,883,810 | A | * | 3/1999 | Franklin et al. ............ 235/379 |
| 5,892,211 | A | * | 4/1999 | Davis et al. ................ 235/380 |
| 5,903,652 | A | * | 5/1999 | Mital .......................... 705/78 |
| 5,903,878 | A | * | 5/1999 | Talati et al. ................. 705/26 |
| 5,915,226 | A | * | 6/1999 | Martineau ................... 379/114 |
| 5,952,639 | A | * | 9/1999 | Ohki et al. .................. 235/379 |
| 5,963,917 | A | * | 10/1999 | Ogram ........................ 705/26 |
| 6,006,205 | A | * | 12/1999 | Loeb et al. ................... 705/34 |
| 6,009,156 | A | * | 12/1999 | Cross .......................... 179/144 |
| 6,012,049 | A | * | 1/2000 | Kawan ........................ 705/41 |
| 6,012,637 | A | * | 1/2000 | Hirokawa ................... 235/380 |
| 6,021,189 | A | * | 2/2000 | Vu ............................... 379/144 |
| 6,055,314 | A | * | 4/2000 | Spies et al. ................... 380/21 |
| 6,072,870 | A | * | 6/2000 | Nguyen et al. ............... 705/79 |
| 6,189,787 | B1 | * | 2/2001 | Dorf ........................... 235/380 |

* cited by examiner

| CARD ID | PASSWORD | BALANCE OF POINTS FOR USING SERVICES |
|---------|----------|--------------------------------------|
| CARD 1  | a b c    | 1 0 0 0                              |
| CARD 2  | d e f    | 2 3 0 0                              |
| CARD 3  | g h i    | 5 0 0                                |
| CARD 4  | j k l    | 4 0 0 0                              |
| CARD 5  | x y z    | 2 0 0 0 0                            |
| . . .   | . . .    | . . .                                |

METHOD AND SYSTEM FOR BILLING ON THE INTERNET

BACKGROUND OF THE INVENTION

1. Field of the Invention

The present invention generally relates to a method, a system and a computer usable medium storing a program for billing on the Internet, and, more particularly, to a method, a system and a computer usable medium storing a program for billing for a chargeable service on the Internet.

2. Description of the Related Art

As a billing system for a chargeable service on the Internet, there have been a system using a credit card, a members-only system for a specific service and so on. For using such systems, a user must become a member of the credit card or a member of the service provider. Then, the user will be provided with service within a limited scope. Also, there have been billing systems using prepaid cards. As an example of such billing systems using prepaid cards, the Japanese laid-open patent application No.9-251494 discloses "a payment system using a virtual prepaid card." In the following, a general outline of the steps for a payment by this system will be described.

(step 1) A general member's terminal makes a request of a payment center of the system for a virtual prepaid card. Then, the payment center provides the general member with the virtual prepaid card after acknowledging receipt of money from the general member. For adding money to the payment server of the system, the general member may use a credit card, may deposit into a predetermined bank account in connection with the payment server, or the like.

(step 2) After obtaining the virtual prepaid card, the general member selects wanted goods from a list of goods, which list is sent from a shop member's terminal via a network, and displayed on the general member's terminal. Then, the general member completes the order.

(step 3) The general member sends a payment instruction (such as a transaction number), which is signed electronically and encrypted, to the payment center from the general member's terminal.

(step 4) After the payment center receives the payment instruction, it verifies the electronic signature and checks whether the instruction is really sent from an authorized general member. Then, the payment center checks a balance of the virtual prepaid card of the general member.

(step 5) If the procedures of step 1-step 4 are complete correctly, the payment center sends a payment notice (such as a transaction number), which is signed electronically and encrypted, to the shop member's terminal. At the same time, the payment center sends an updated balance of the virtual prepaid card to the general member's terminal. As a result of this, the payment from the general member to the shop member is completed.

(step 6) The shop member's terminal which received the payment notice verifies the electronic signature and checks whether the notice is really sent from an authorized payment center. Then, the shop member sends the selected goods to the general member.

However, there are disadvantages of the above-mentioned systems. To use services provided by the above-mentioned systems, a user must become a member of the credit card or a member of the service provider. Therefore, the number of users will be limited. Also, to become a member of the credit card or the service provider, one must disclose personal information to the credit card provider or the service provider, and cannot use the service without disclosing the personal information. Further, the procedure for becoming a member is complicated and is not convenient. Furthermore, sending a credit card number on the Internet introduces a risk of interception and abuse of the credit card number by a third party.

Also, in the above-mentioned "a payment system using a virtual prepaid card," after the completion of the order process between the general member's terminal and the shop member's terminal, the payment center performs the payment process in accordance with the instruction from the general member. Therefore, there is a disadvantage that the system receives an order from a general member's terminal without verification of the general member and balance of the virtual prepaid card. Accordingly, in the above-mentioned "a payment system using a virtual prepaid card," a fraudulent order by an ill-intentioned third party cannot be rejected. Also, the system cannot reject an order from a general member's terminal even if the balance of the prepaid card of the member is not enough. Further, the system cannot refuse an order even if the payment center is not operating.

SUMMARY OF THE INVENTION

It is a general object of the present invention to provide an Internet billing method, system and a computer usable medium which can reject invalid orders with reliability, and which can be used without a credit card.

The above object of the present invention is achieved by an Internet billing method which makes billing on the Internet possible, wherein the method includes the steps of:

making a request, by a terminal, of a content server for a chargeable service by using a prepaid information medium which has predetermined information necessary for transactions;

making a request, by the content server, of a prepaid information management server for authentication to check whether the prepaid information medium is authorized to be used for the chargeable service, and for billing for the prepaid information medium;

authenticating, by the prepaid information management server, the prepaid information medium;

performing, by the prepaid information management server, the billing for the prepaid information medium on the basis of usage of the chargeable service; and providing the terminal, by the content server, with the chargeable service.

In the above Internet billing method, a password included in the predetermined information may be input to the terminal by a user instead of from the prepaid information medium.

The above object of the present invention is also achieved by an Internet billing method which makes billing on the Internet possible, the method including the steps of:

making a request, by a terminal, of a content server for a service menu by using a prepaid information medium which has predetermined information necessary for transactions;

sending the service menu to the terminal by the content server;

making a request, by the terminal, of the content server for a chargeable service upon selecting needed service by a user;

making a request, by the content server, of a prepaid information management server for authentication to check whether the prepaid information medium is authorized to be used for the chargeable service, and for billing for the prepaid information medium;

sending, by the terminal, to the prepaid information management server, an ID stored in the prepaid information medium upon receipt of a request from the prepaid information management server;

sending information for authentication to the terminal by the prepaid information management server;

performing a predetermined operation of concatenation of the information and a password by the terminal;

sending a result of the operation to the prepaid information management server;

performing, by the prepaid information management server, the same operation as performed in the terminal of concatenation of the information and the password of the prepaid information medium, which password is stored in a database, and authenticating the prepaid information medium by verifying a result of the operation against the result sent from the terminal;

searching the database for a balance of the prepaid card having the ID, and performing billing with reference to the balance, by the prepaid information management server;

notifying the terminal of information including the balance of the prepaid information medium by the prepaid information management server if both authentication and billing succeed; and providing, by the content server, the chargeable service to the terminal.

In the Internet billing method, the password may be input to the terminal by a user instead of from the prepaid information medium.

The above object of the present invention is achieved by, in an Internet billing system which makes billing on the Internet possible, in which system at least one terminal, at least one content server and at least one prepaid information management server are connected to a network, a method for controlling the terminal, the method including the steps of:

accessing the content server on the basis of address information stored in a prepaid information medium which has predetermined information necessary for transactions, and making a request for a service menu;

making a request of the content server for a chargeable service;

sending, upon receipt of a request from the prepaid information management server, an ID stored in the prepaid information medium to the prepaid information management server;

receiving information for authentication from the prepaid information management server, reading out a password stored in the prepaid information medium, performing a predetermined operation on concatenation of the information and the password, and sending a result of the operation to the prepaid information management server; and writing information including a balance of the prepaid information medium to the prepaid information medium on the basis of notification from the prepaid information management server.

The above object of the present invention is also achieved by, in an Internet billing system which makes billing on the Internet possible, in which system at least one terminal, at least one content server and at least one prepaid information management server are connected to a network, a method for controlling the content server, the method including the steps of:

receiving a request for a service menu from the terminal on the basis of address information stored in a prepaid information medium which has predetermined information necessary for transactions, and sending the service menu to the terminal;

receiving a request for a chargeable service from the terminal;

making a request of the prepaid information management server for authentication by sending a message which includes an address of the terminal to the prepaid information management server, and for billing for the prepaid information medium by sending a number of points necessary for the chargeable service; and providing the chargeable service to the terminal if both the authentication and billing succeed.

The above object of the present invention is also achieved by, in an Internet billing system which makes billing on the Internet possible, in which system at least one terminal, at least one content server and at least one prepaid information management server are connected to a network, a method for controlling the prepaid information management server, the method including the steps of:

receiving a request for authentication of a prepaid information medium, used at the terminal, which prepaid information medium has predetermined information necessary for transactions, and for billing for the prepaid information medium;

making a request for an ID stored in the prepaid information medium, and receiving the ID;

sending information for authentication to the terminal;

receiving a result of an operation performed by the terminal;

performing the same operation as performed in the terminal by referring to a database which stores prepaid information, and authenticating the prepaid information medium by verifying a result of the operation against a result sent from the terminal;

decrementing a balance of the prepaid information medium by necessary points if the authentication succeeds; and notifying the terminal of information which includes the decremented balance of the prepaid information medium.

The above object of the present invention is also achieved by an Internet billing system which makes billing on the Internet possible, the Internet billing system including at least one terminal, at least one content server and at least one prepaid information management server which are connected to a network, wherein the terminal includes:
  a part for making a request of the content server for a chargeable service by using a prepaid information medium;

wherein the content server includes:
  a part for making a request of the prepaid information management server for authentication to check whether the prepaid information medium is authorized to be used for the chargeable service;
  a part for making a request of the prepaid information management server for billing for the prepaid information medium; and
  a part for providing the chargeable service to the terminal; and wherein the prepaid information management server includes:

a part for authenticating the prepaid information medium; and a part for performing the billing for the prepaid information medium on the basis of usage of the chargeable service.

The above object of the present invention is also achieved by an Internet billing system which makes billing on the Internet possible, the Internet billing system including at least one terminal, at least one content server and at least one prepaid information management server which are connected to a network, wherein the terminal includes:

a part for making a request of the content server for a chargeable service by using a prepaid information medium which has predetermined information necessary for transactions;

a part for sending an ID stored in the prepaid information medium upon receipt of a request from the prepaid information management server;

a part for reading out a password stored in the prepaid information medium on the basis of information for authentication received from the prepaid information management server, performing a predetermined operation and sending a result of the operation to the prepaid information management server; and a part for writing information including a balance of the prepaid information medium to the prepaid information medium on the basis of notification from the prepaid information management server;

wherein the content server includes:

a part for making a request of the prepaid information management server for authentication to check whether the prepaid information medium is authorized to be used for the chargeable service;

a part for making a request of the prepaid information management server for billing for the prepaid information medium; and a part for providing the chargeable service to the terminal if both authentication and billing succeed; and wherein the prepaid information management server includes:

a part for authenticating the prepaid information medium at the terminal upon receipt of a request for authentication from the content server;

a part for performing the billing on the basis of usage of the chargeable service; and a part for notifying the terminal of information including the balance of the prepaid information medium.

The above object of the present invention is also achieved by an article of manufacture including a computer usable medium having computer-readable code means embodied therein for causing, in an Internet billing system which makes billing on the Internet possible, in which system at least one terminal, at least one content server and at least one prepaid information management server are connected to a network, a computer to control the terminal, the computer readable code means including:

computer-readable program code means for accessing the content server on the basis of address information stored in a prepaid information medium which has predetermined information necessary for transactions, and making a request for a service menu;

computer-readable program code means for making a request of the content server for a chargeable service;

computer-readable program code means for sending, upon receipt of a request from the prepaid information management server, an ID stored in the prepaid information medium to the prepaid information management server;

computer-readable program code means for receiving information for authentication from the prepaid information management server, reading out a password stored in the prepaid information medium, performing a predetermined operation of concatenation of the information and the password, and sending a result of the operation to the prepaid information management server; and computer-readable program code means for writing information including a balance of the prepaid information medium to the prepaid information medium on the basis of notification from the prepaid information management server.

The above object of the present invention is achieved by an article of manufacture including a computer usable medium having computer-readable code means embodied therein for causing, in an Internet billing system which makes billing on the Internet possible, in which system at least one terminal, at least one content server and at least one prepaid information management server are connected to a network, a computer to control the content server, the computer readable code means including:

computer-readable program code means for receiving a request for a service menu sent from the terminal on the basis of address information stored in a prepaid information medium which has predetermined information necessary for transactions, and sending the service menu to the terminal;

computer-readable program code means for receiving a request for a chargeable service from the terminal;

computer-readable program code means for making a request of the prepaid information management server for authentication by sending a message which includes an address of the terminal to the prepaid information management server;

computer-readable program code means for billing for the prepaid information medium by sending a point number necessary for the chargeable service; and computer-readable program code means for providing the terminal with the chargeable service if both authentication and billing succeed.

The above object of the present invention is also achieved by an article of manufacture including a computer usable medium having computer-readable code means embodied therein for causing, in an Internet billing system which makes billing on the Internet possible, in which system at least one terminal, at least one content server and at least one prepaid information management server are connected to a network, a computer to control the prepaid information management server, the computer readable code means including:

computer-readable program code means for receiving a request for authentication of a prepaid information medium, used at the terminal, which prepaid information medium has predetermined information necessary for transactions, and for billing for the prepaid information medium;

computer-readable program code means for making a request for an ID stored in the prepaid information medium, and receiving the ID;

computer-readable program code means for sending information for authentication to the terminal;

computer-readable program code means for receiving a result of an operation performed by the terminal;

computer-readable program code means for performing the same operation as performed in the terminal by referring to a database which stores prepaid information, and authenticating the prepaid information medium by verifying a result of the operation against the result sent from the terminal;

computer-readable program code means for decrementing a balance of the prepaid information medium by necessary points if the authentication succeeds; and computer-readable program code means for notifying the terminal of information which includes the decremented balance of the prepaid information medium.

The above object of the present invention is also achieved by an IC card, in an Internet billing system which makes billing on the Internet possible, in which system at least one terminal, at least one content server and at least one prepaid information management server are connected to a network, the IC card including:

a part for connecting to the terminal;

predetermined information, which includes a password, necessary for transactions;

a part for retrieving information on authentication of the IC card from the prepaid information management server; and a part for performing a predetermined operation on the password and the retrieved information, wherein the terminal sends a result of the operation to the prepaid information management server, and the prepaid information management server authenticates the IC card by performing the same operation as performed in the IC card and by verifying a result of the same operation against the result of the operation performed in the IC card.

According to the present invention, the content server receives a chargeable service request from the terminal only when the authentication and billing are completed successfully, so that the content server can reject invalid orders with reliability.

Also, according to the present invention, secret information of the prepaid information medium such as the password can be reliably prevented from being obtained by an invalid content server.

Further, the prepaid information management server writes the balance and the date and time of use of service if the authentication and billing are completed successfully, so that a user of the prepaid information medium can know the balance and the history of use on the terminal without accessing the prepaid information management server.

BRIEF DESCRIPTION OF THE DRAWINGS

Other objects, features and advantages of the present invention will become more apparent from the following detailed description when read in conjunction with the accompanying drawings, in which:

FIG. 3 is an example of a table within a database of a card management server of an Internet billing system according to an embodiment of the present invention;

DETAILED DESCRIPTION OF THE PREFERRED EMBODIMENTS

A prepaid information medium which is used when a user makes a request for a service to a content server will be called a "prepaid card" hereinafter, but the form of the prepaid information medium is not limited to a card. Also, a prepaid information management server will be called "a card management server" hereinafter, but the server can manage various information other than card information.

The prepaid card is distributed and managed, for example, by a card management company. A user buys the prepaid card in order to utilize a service. In the prepaid card, information on a content server address, a card ID, a card password and so on, are stored. A remaining amount or remaining points for using available service are managed by a prepaid information management server, that is to say, a card management server.

Figure 1:
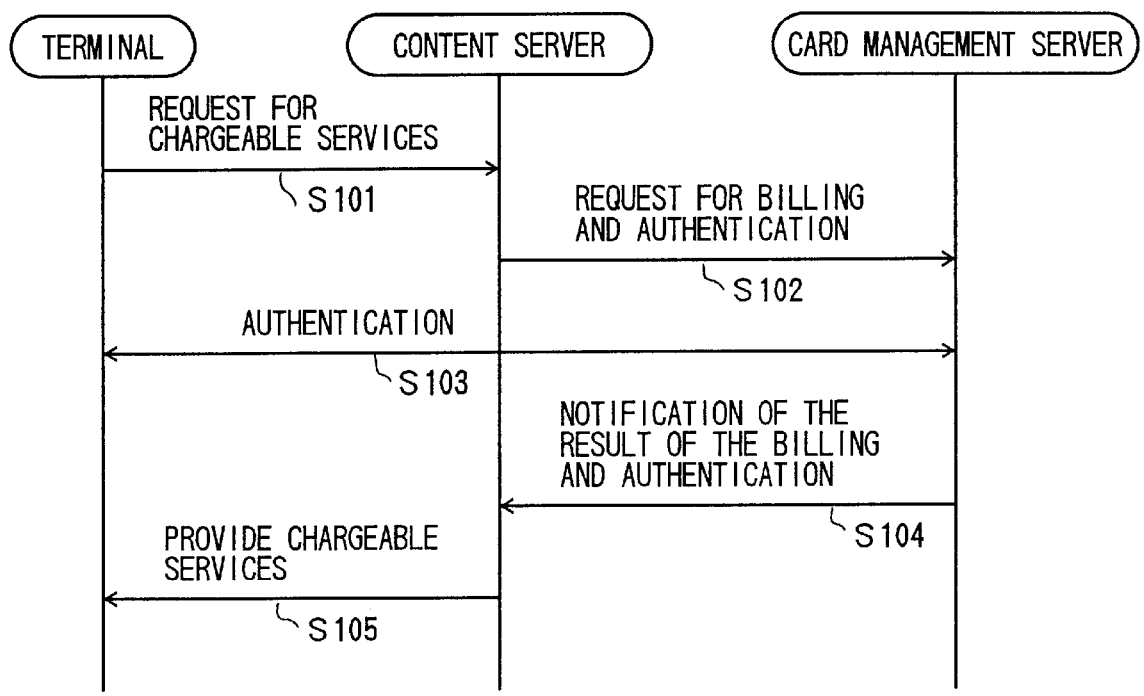
FIG. 1 is a sequence chart for explaining a general outline of an operation of an Internet billing system of the present invention.

A general outline of an operation of the Internet billing system of the present invention will now be described with reference to FIG. 1.

In step 101, a request for a chargeable service is sent from the terminal to the content server on the basis of address information (for example, URL on HTTP) of the content server stored in the prepaid card (IC card, floppy disk, magnetic card, and so on). The content server, in step 102, makes a request for authentication and billing to the card management server, then, in step 103, the card management server authenticates the prepaid card at the terminal, and in step 104, sends the result of the authentication and billing to the content server. If the authentication and the billing are successfully completed, the content server, in step 105, provides the terminal with the chargeable service.

Figure 2:
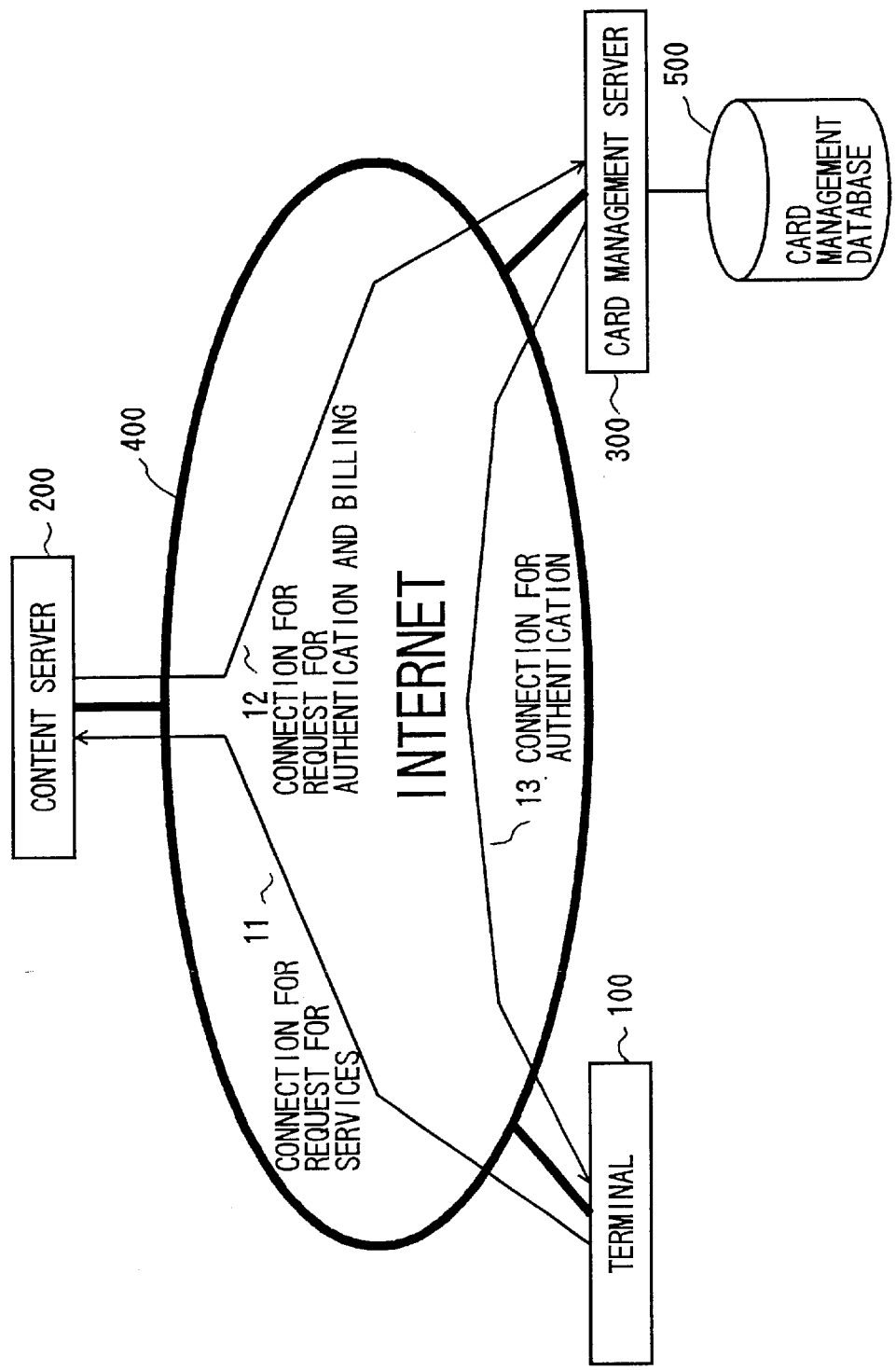
FIG. 2 is a connection block diagram of an Internet billing system according to an embodiment of the present invention.

FIG. 2 is a connection block diagram of an Internet billing system according to an embodiment of the present invention. A terminal 100 sets a connection 11 to a content server 200 via the Internet 400 and makes a request for a chargeable service by using the connection 11. After receiving the chargeable service request from the terminal 100, the content server 200 sets a connection 12 to a card management server 300 and makes a request of the card management server 300 for authentication and billing of the prepaid card by sending information including an IP address of the terminal 100.

After receiving the authentication and billing request from the content server 200, the card management server 300 sets a connection 13 to the terminal 100 and makes a request of the terminal 100 for an operation on the password of the prepaid card. The terminal 100 sends the result of the operation to the card management server 300 by using the connection 13. The card management server 300 has a card management database 500 storing card IDs, passwords and balances of each card. An example of data within the database 500 is shown in FIG. 3. The card management server 300 retrieves the password of the user ID from the database and performs the same operation on the password as performed in the terminal 100. If the result of the operation by the card management server 300 matches the result of the operation by the terminal 100, the authentication is successful. After the authentication and billing by the card management server 300, the card management server 300 notifies the content server 200 of the result of the authentication and billing. If the authentication and billing are successfully completed, the content server 200 starts providing the chargeable service to the terminal 100. If the authentication or billing is not successfully completed, the content server 200 notifies the terminal 100 by using the connection 11 that the prepaid card is not available for use.

Figure 4:
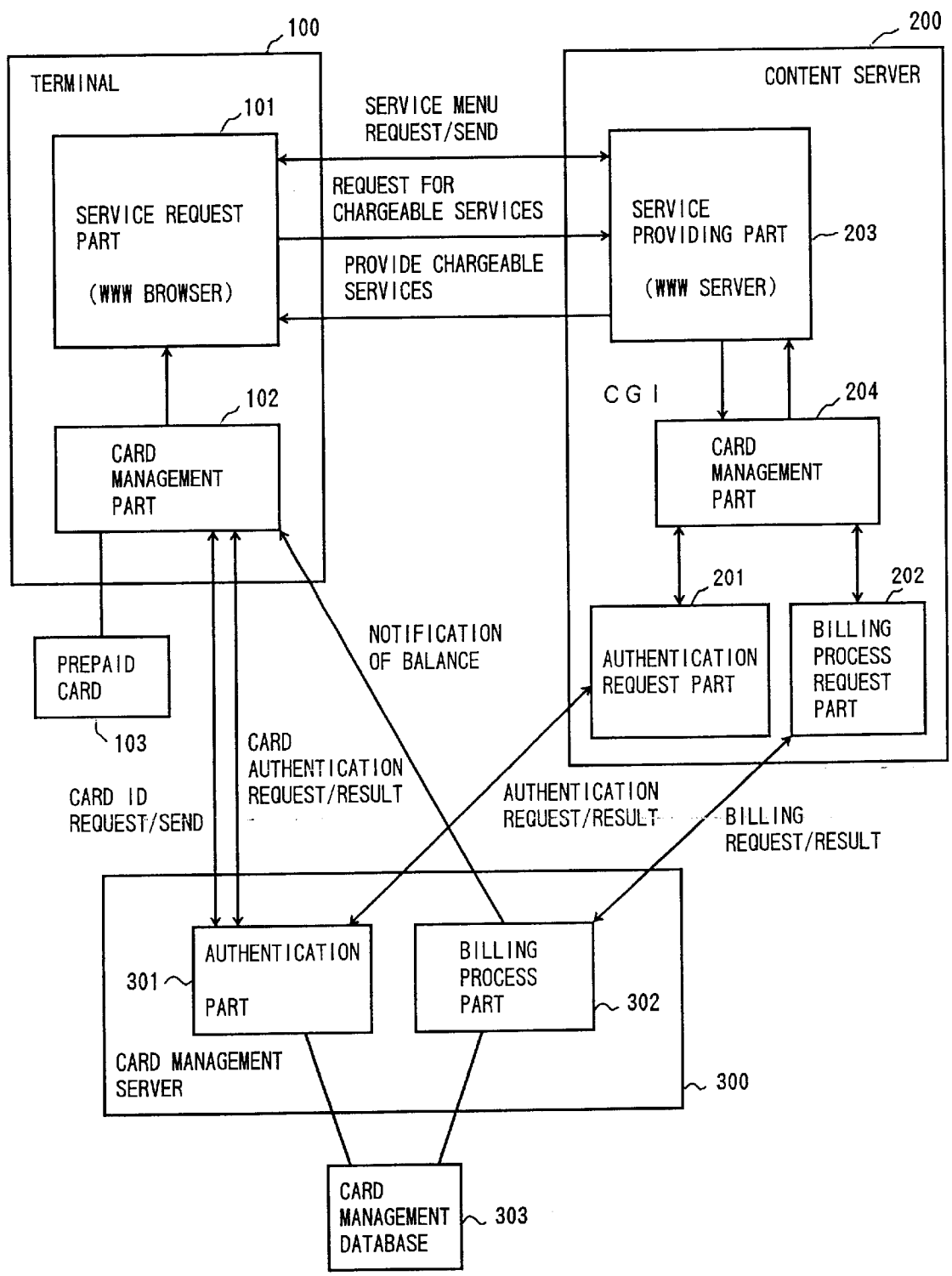
FIG. 4 is a block diagram of an Internet billing system according to an embodiment of the present invention.

In the following, a configuration of an Internet billing system will be described. FIG. 4 is a block diagram of an Internet billing system according to an embodiment of the present invention. As shown in FIG. 4, the Internet billing system has a terminal 100, a content server 200 and a card management server 300. The terminal 100 accesses the content server 200 on the basis of content server address information stored in the prepaid card and makes a request for a chargeable service. The content server 200 provides the service upon receipt of the request from the terminal 100. The card management server 300 authenticates and bills the prepaid card upon receipt of a request from the content server 200.

The terminal 100 has a service request part 101 and a card management part 102. The service request part 101 automatically sets a connection to the content server 200 on the basis of the content server address information (such as URL) stored in the prepaid card and makes a request for a chargeable service. The service request part 101 may be embodied, for example, by a WWW browser. The card management part 102 is connected to a prepaid card 103 via a reader suitable for the prepaid card 103 and sends a card ID stored in the prepaid card 103 upon receipt of a request from the card management server 300. Also, the card management part 102 reads out secret information (such as a password) from the prepaid card 103 upon receipt of a request from the card management server 300, and sends the information to the card management server 300 after performing an operation of, for example, one-way function on the information. Further, the card management part 102 writes a balance and a date and time of the use of the prepaid card 103 to the prepaid card 103 upon receipt of a notification from the card management server 300.

The content server 200 has an authentication request part 201, a billing process request part 202, a service providing part 203, and a card management part 204. The authentication request part 201, upon receipt of a chargeable service from the terminal 100, makes a request of the card management server 300 for authentication which confirms the validity of the prepaid card. The billing process request part 202 makes a request of the card management server 300 for billing of the prepaid card. The service providing part 203, if both the authentication and the billing are successful, provides a chargeable service to the terminal 100. The card management part 204 makes a request of the authentication request part 201 and the billing process request part 202 for authentication and billing of the prepaid card.

The card management server 300 has a authentication part 301, a billing process part 302 and a card management database 303. The authentication part 301, upon receipt of a request for authentication, authenticates the prepaid card at the terminal 100. The billing process part 302 bills the prepaid card on the basis of the usage of the chargeable service, and notifies the terminal 100 of a balance and a date and time of use of the prepaid card 103. The card management database 303 stores information on prepaid cards such as card IDs, passwords, and balances.

Figure 5:
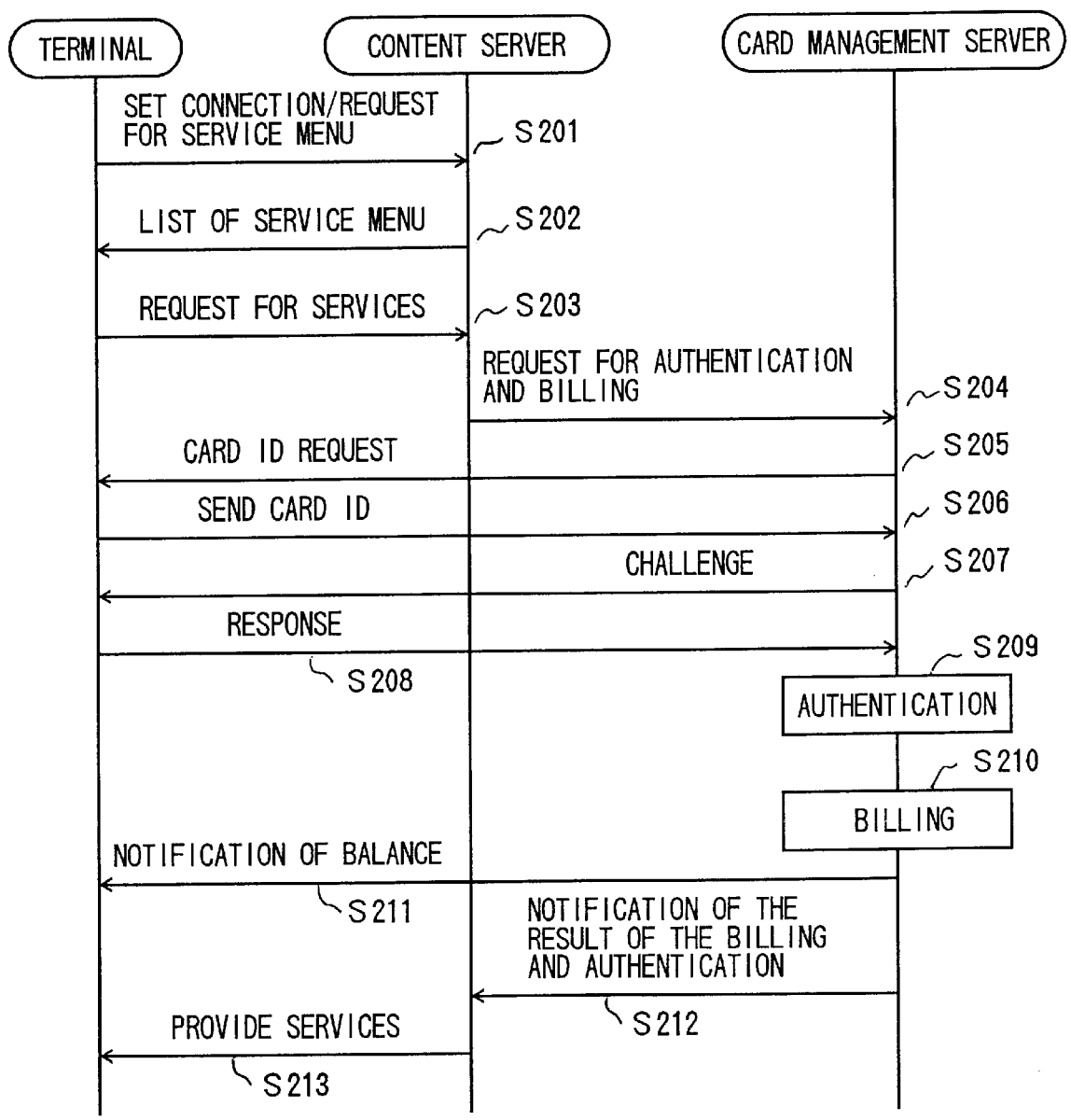
FIG. 5 is a sequence chart for explaining a series of operations of an Internet billing system of the present invention.

In the following, the operation of the above-mentioned Internet billing system will be described. FIG. 5 is a sequence chart for explaining a series of operations of the Internet billing system of the present invention. In the sequence chart, the Challenge Response method defined in the RFC1334 (W. Simpson, "PPP Challenge Handshake Authentication Protocol (CHAP)", August 1996) will be used as an example of a distribution and authentication method for chargeable video service.

In step 201, the terminal 100, by using content server address information (such as URL) stored in the prepaid card 103 sets a connection to the content server 200 which has the address and makes a request for a service menu. In step 202, the content server 200 sends a service menu such as a video program list to the terminal 100 after the setup of the connection. In step 203, if a user selects a service from the service menu, a service request message is sent to the content server 200. The needed number of points for the selected service may be included in the request message. The content server, in step 204, sets a connection to the card management server 300, and sends, as a request for authentication which confirms the validity of the prepaid card, an authentication request message in which an IP address of the terminal 100 is included by using the connection to the card management server 300. At the same time, the content server 200 sends a billing request message including the number of points of the service to the card management server 300. The authentication request message and the billing request message may be the same one message or separate messages. In step 205, the card management server 300 sets a connection to the terminal 100 on the basis of the IP address of the terminal 100 in the received authentication request message and makes a request for a card ID of the prepaid card to the terminal 100 by using the connection. The terminal 100 sends, in step 206, the card ID stored in the prepaid card 103 to the card management server 300. The card management server 300, in step 207, sends a random number (challenge) for authentication to the terminal 100 by using the connection. The random number varies from authentication to authentication. In step 208, the terminal 100 which receives the random number performs an operation of one-way function, for example, MD5" (Rivest R. and S. Dusse, "The MD5 Message-Digest Algorithm," April 1992) of concatenation of the random number and the password. Then, the terminal 100 sends a reply message (Response) including the result of the operation to the card management server 300. In step 209, the card management server 300 performs the same one-way function operation of concatenation of the password and the random number. In this time, the password is retrieved from the card management database 500. The card management server 300 verifies the result of the operation against the reply from the terminal 100. If they match, the authentication succeeds, if not, the authentication fails.

As mentioned above, the card management server 300 uses the random number which varies in each authentication of the prepaid card. Therefore, even if a third party intercepts a random number during the challenge session, the third party cannot fake the terminal 100 by using the random number another time. Further, because the result of the operation of the one-way function is used for the response session, the original password cannot be estimated even if a third party intercepts the response.

In step 210, the card management server 300 searches the database for the balance of the prepaid card 103 having the card ID. If the balance of the prepaid card 103 is larger than the number of points included in the billing request message, the card management server 300 decrements the balance by the number of points. If the balance of the prepaid card is smaller than the number of points included in the billing request message, the billing cannot be completed and the process terminates. In step 211, the card management server 300 notifies the terminal 100 of the balance of the prepaid card 103 and the date and time of utilizing the service. The card management server 300, in step 212, notifies the content server 200 of the result of the authentication and billing. If the authentication or billing fails, the process terminates. In step 213, the content server 200 provides a chargeable service to the terminal 100.

Figure 6:
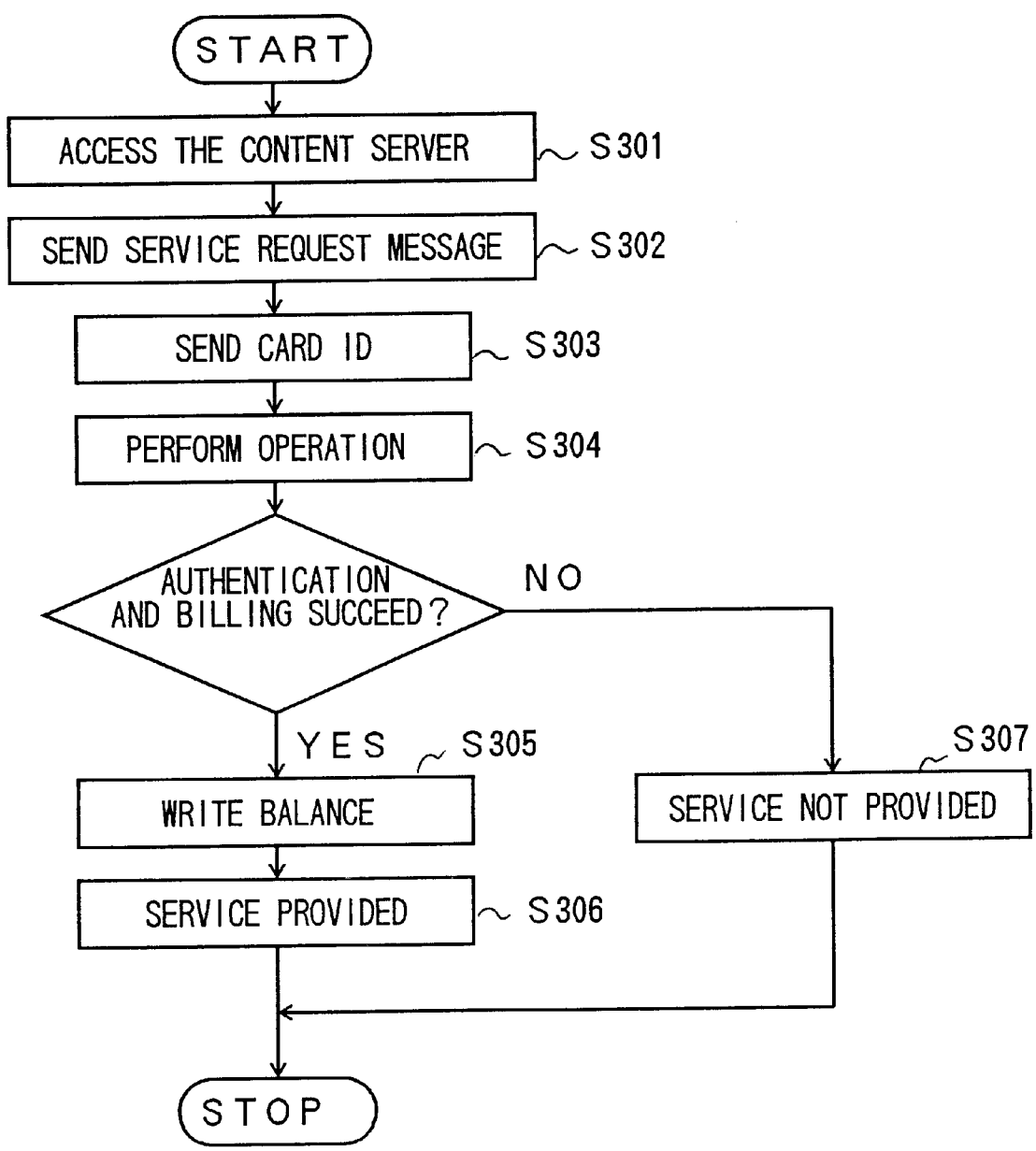
FIG. 6 is a flowchart for explaining an operation of a terminal according to an embodiment of the present invention.

FIG. 6 is a flowchart for explaining an operation of the terminal 100 according to an embodiment of the present invention. The operation of the terminal 100 will be described in the following.

In step 301, the terminal 100, by using an address information stored in the prepaid card 103, sets a connection to the content server 200 and makes a request for a service menu. In step 302, the terminal 100 sends to the content server 200 a service request message which includes the needed number of points. In step 303, the terminal 100 sends a card ID stored in the prepaid card to the card management server 300 upon receipt of a request from the card management server 300. Upon a request from the card management server 300, in step 304, the terminal 100 reads out secret information (such as a password) stored in the prepaid card and after performing an operation of, for example, one-way function, on the secret information, sends the operated-on information to the card management server 300. If the authentication and the billing succeed, in step 305, the terminal 100 writes the balance and the date and time of use to the prepaid card 103 upon receipt of this information from the card management server 300. In step 306, the terminal 100 receives the chargeable service. If the authentication or the billing fails, the chargeable service will not be provided to the terminal 100 (in step 307).

Figure 7:
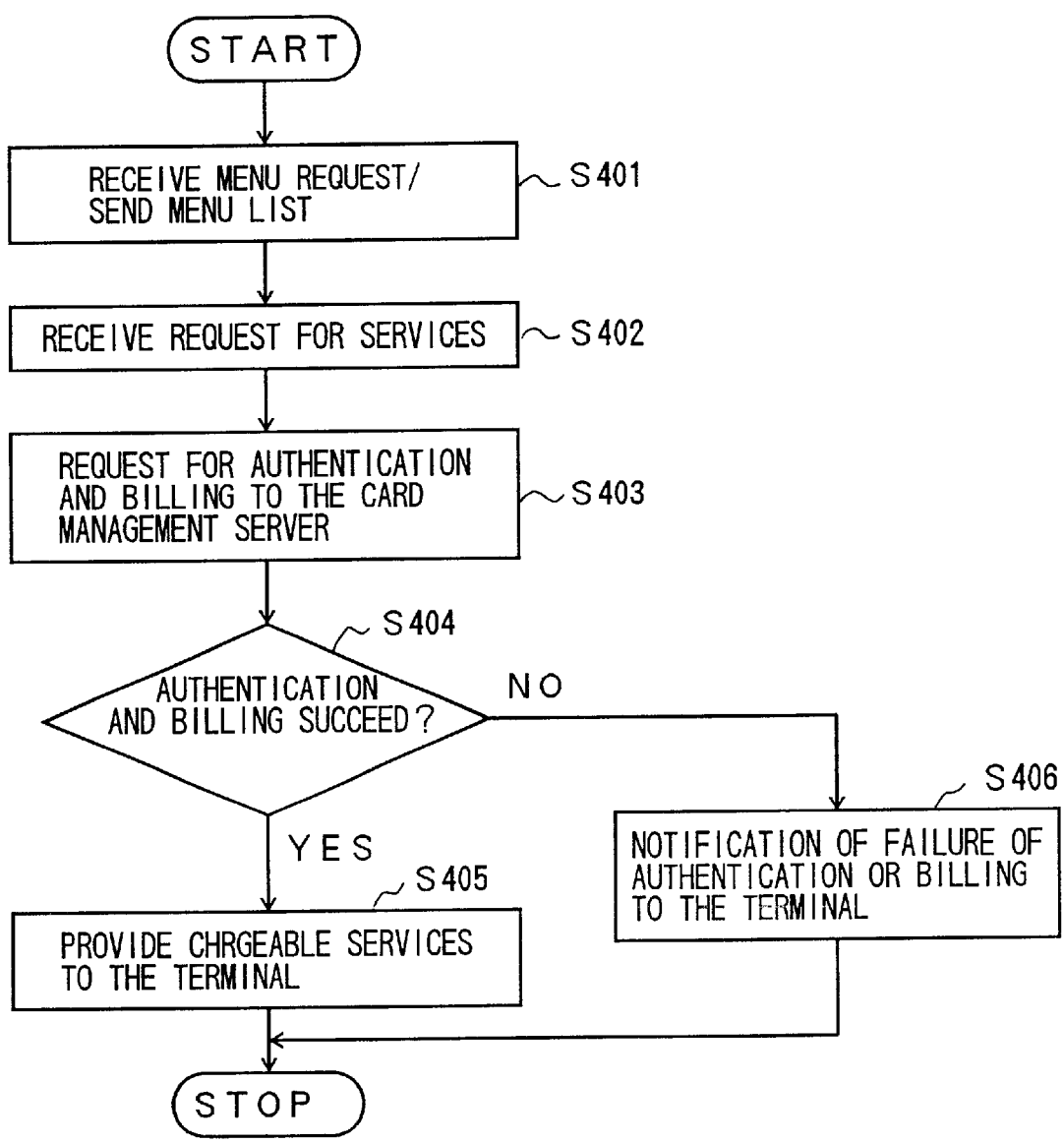
FIG. 7 is a flowchart for explaining an operation of a content server according to an embodiment of the present invention.

The operation of the content server will be described in the following by using FIG. 7. FIG. 7 is a flowchart of the operation of the content server according to an embodiment of the present invention. In step 401, the content server 200 receives a request for a service menu from the terminal 100, and sends a menu list to the terminal 100. The content server, in step 402, receives a chargeable service request from the terminal 100. In step 403, the content server may set a card ID in a card ID part of an authentication and billing message, the terminal address in a terminal address part of the message and the needed points for the service in a service point part of the message. Then, the content server 200 makes a request for authentication and billing of the prepaid card 103 by sending the message to the card management server 300. In this embodiment, because the card management server 300 makes a request for a card ID of the prepaid card to the terminal 100, the content server may not set a card ID. In other embodiments, the terminal 100 may send the card ID when the terminal 100 makes a request of the content server 200 for the chargeable service, or, the terminal 100 may send the card ID to the content server 200 on the basis of a request from the content server 200. In these cases, the content server sets the card ID. If both the authentication and billing succeed (in step 404), the content server 200 starts providing the chargeable service to the terminal 100 in step 405. If the authentication or billing fails (in step 404), the content server notifies the terminal 100 of the failure of the authentication or billing (in step 406).

Figure 8:
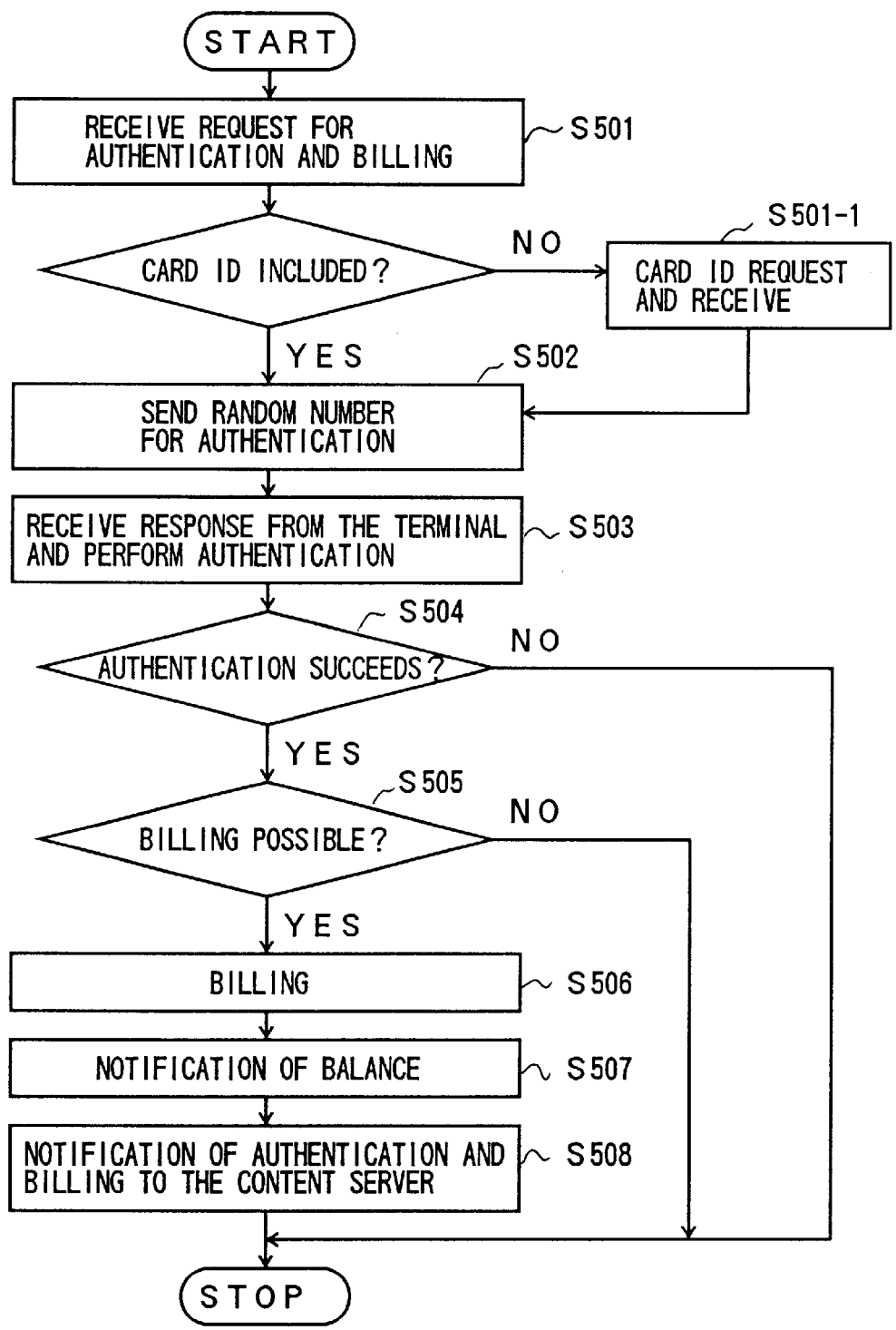
FIG. 8 is a flowchart for explaining an operation of a card management server according to an embodiment of the present invention.

FIG. 8 is a flowchart of the operation of the card management server according to an embodiment of the present invention. The operation of the card management server 300 will be described with reference to FIG. 8 in the following.

In step 501, the card management server receives the authentication and billing request message of the prepaid card 103 from the content server 200. If the card ID is not set in the message, the card management server 300, in step 501-1, sets a connection to the terminal 100 on the basis of the IP address of the terminal 100 in the received authentication and billing request message makes a request for the card ID to the terminal 100 by using the connection. Then, the card management server 300 receives the card ID from the terminal 100 as a response of the request. If the card ID is set in the message in the step 501, or after the step 501-1, the card management server 300, in step 502, sets a connection to the terminal 100 on the basis of the IP address of the terminal 100 in the received authentication and billing request message if there is no connection to the terminal 100, and sends a random number (challenge) for authentication by using the connection to the terminal 100. The random number varies from authentication to authentication. In step 503, the card management server 300 receives a reply (Response) from the terminal 100 and performs the same one-way function operation as performed in the terminal of concatenation of the password and the random number. The password is retrieved from the card management database 500. The card management server 300 verifies the result of the operation against the reply from the terminal 100. If they match, the authentication succeeds; if not, the authentication fails.

If the authentication and billing succeed and the balance of the prepaid card 103 is larger than the needed number of service points, which number is included in the billing request message (in steps 504 and 505), the card management server 300 decrements the balance by the number of service points in step 506. If the authentication fails (in step 504), the process terminates. If the balance of the prepaid card is smaller than the number of service point (in step 505), the billing becomes impossible. In step 507, the card management server 300 notifies the terminal 100 of the decremented balance of the prepaid card 103 and the date and time of using the service. In step 508, the card management server 300 notifies the content server of the result of the authentication and billing.

In the above-mentioned embodiment, other authentication methods can be used.

Further, as chargeable services which can be provided to the terminal, there are, for example, a program download service, on-line shopping and so on. Examples of the form of the prepaid card are an IC card, a floppy disk, a magnetic disk, and so on. Also, in the above-mentioned embodiment, a user may input the password manually instead of using the password stored in the prepaid card. Further, the content server may make a request of the card management server for billing after the authentication of the prepaid card succeeds. Furthermore, the prepaid card may store an amount of money, points, and various other prepaid information.

Figure 9:
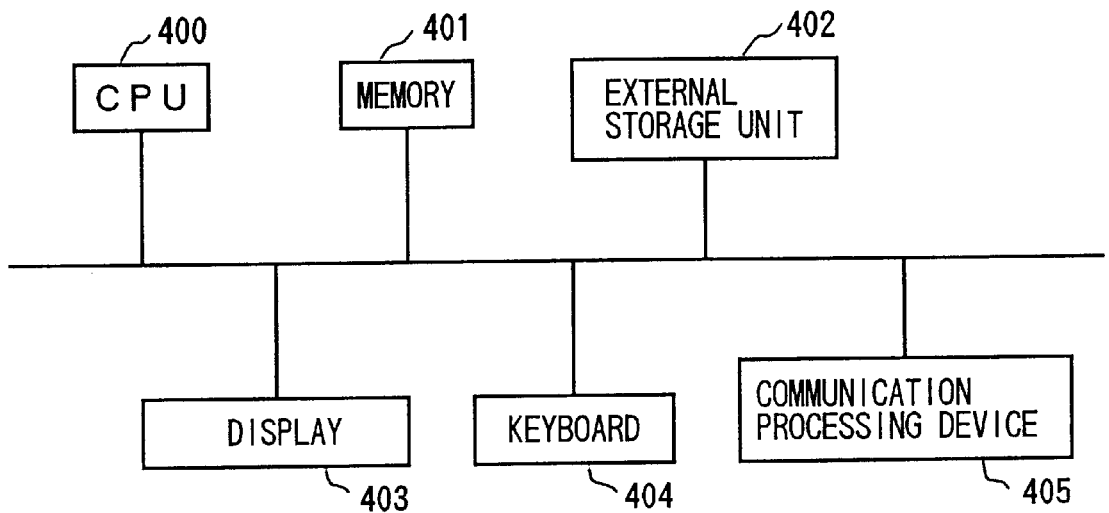
FIG. 9 is a block diagram of a computer system for explaining an embodiment of a computer usable medium according to the present invention.

In the following, a computer usable medium of the present invention will be described. FIG. 9 is a block diagram of a computer system. The computer system comprises a CPU 400, a memory 401, an external storage unit 402, a display 403, a keyboard 404, and a communication processing device 405. The computer usable medium of the present invention corresponds to the memory 401 and/or the external storage device 402. The program carrying out above-mentioned processes is stored in the memory 401 and/or the external storage unit 402, and is run on the CPU 400, and then the processes of the embodiment are carried out. Further, the computer usable medium of the present invention is embodied by an electronic memory, a hard disk, or by a transportable medium such as a floppy disk, a CD-ROM, a magnetic tape and so on. By loading the program for controlling the terminal stored in the medium into a computer system, by loading the program for controlling the content server into another computer system, and by loading the program for controlling the card management server into yet an other computer system, these computer systems can be used as the Internet billing system of the present invention. In this case, the computer system used for the terminal has a prepaid card reader. The reader may be an IC card reader, a floppy disk drive and so on, the selection of which depends on the form of the prepaid card.

Figure 10:
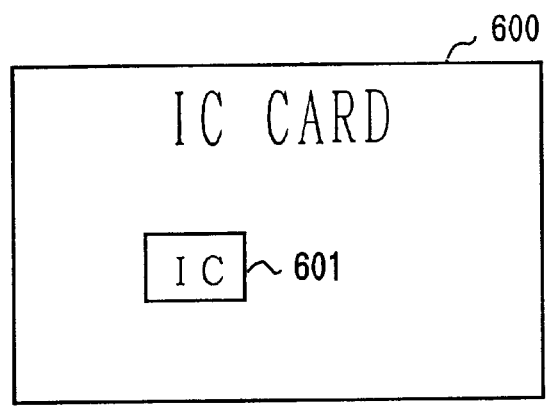
FIG. 10 is a block diagram of an IC card according to an embodiment of the present invention.

An example of an IC card of the present invention is shown in FIG. 10. The IC card 600 is, for example, a plastic card in which an IC 601 is embedded. In the IC 601, data and a program for the above-mentioned operation are stored, and the operation on the password and the random number is performed within the IC 601. Because the password of its original form will not flow out of the IC card, a high-level security will be retained.

As mentioned above, according to the present invention, the content server receives a chargeable service request from the terminal only when the authentication and billing are completed successfully. Therefore, the content server can reject invalid orders with reliability.

Also, according to the present invention, the content server sends the address information of the terminal to the card management server, and then the card management server can authenticate the prepaid card in the terminal by accessing the terminal directly. Therefore, secret information of the prepaid card such as the password can be reliably prevent from being obtained by an invalid content server.

Further, the card management server writes the balance and the date and time of use of service if the authentication and billing are completed successfully. Therefore, the user of the prepaid card can know the balance and the history of use on the terminal without accessing the card management server.

As mentioned above, an application of the present invention is not limited to the prepaid card. The present invention applies to, for example, payment by using a point card such as a mileage card provided by airlines. In the case of a mileage card, accumulated points by using an airline are stored in a database of the card management server. Same as in the case of the prepaid card, a user can use a chargeable service provided by the content server through the use of the points stored in the database of the card management server. Furthermore, the present invention is applicable to payment systems using point cards adopted in various industries other than airlines, such as, department stores, hotels, sales of various materials (CD, video, game software and so on), video/CD rental, supermarkets, sales of home electrical products, gas stations, etc.

The present invention is not limited to the specifically disclosed embodiments, and variations and modifications may be made without departing from the scope of the invention.

What is claimed is:

1. An Internet billing method which makes billing on the Internet possible, said method comprising the steps of:

making a request, by a terminal, of a content server for a chargeable service by using a prepaid information medium which has predetermined information necessary for transactions;

making a request, by said content server, of a prepaid information management server for authentication to check whether said prepaid information medium is authorized to be used for said chargeable service, and for billing for said prepaid information medium;

sending, by said terminal, to said prepaid information management server, an ID stored in said prepaid information medium upon receipt of a request from said prepaid information management server;

sending information for authentication to said terminal by said prepaid information management server;

performing a predetermined operation for a concatenated value of said information and a password which is read from said prepaid information medium by said terminal;

sending a result of the operation to said prepaid information management server;

performing, by said prepaid information management server, the same operation as performed in said terminal of the concatenated value of said information and said password of said prepaid information medium, which password is stored in a database, and authenticating said prepaid information medium by verifying a result of the operation against the result sent from said terminal;

performing, by said prepaid information management server, the billing for the prepaid information medium on the basis of usage of the chargeable service; and providing said terminal, by said content server, with said chargeable service.

2. The Internet billing method as claimed in claim 1, wherein a password included in said predetermined information is input to said terminal by a user instead of from said prepaid information medium.

3. An Internet billing method which makes billing on the Internet possible, said method comprising the steps of:

making a request, by a terminal, of a content server for a service menu by using a prepaid information medium which has predetermined information necessary for transactions;

sending the service menu to said terminal by said content server;

making a request, by said terminal, of said content server for a chargeable service upon selecting needed service by a user;

making a request, by said content server, of a prepaid information management server for authentication to check whether said prepaid information medium is authorized to be used for said chargeable service, and for billing for said prepaid information medium;

sending, by said terminal, to said prepaid information management server, an ID stored in said prepaid information medium upon receipt of a request from said prepaid information management server;

sending information for authentication to said terminal by said prepaid information management server;

performing a predetermined operation for a concatenated value of said information and a password by said terminal;

sending a result of the operation to said prepaid information management server;

performing, by said prepaid information management server, the same operation as performed in said terminal of the concatenated value of said information for authentication and said password of said prepaid information medium, which password is stored in a database, and authenticating said prepaid information medium by verifying a result of the operation against the result sent from said terminal;

searching the database for a balance of the prepaid information medium having said ID, and performing billing with reference to the balance, by the prepaid information management server;

notifying said terminal of information including the balance of said prepaid information medium by said prepaid information management server if both authentication and billing succeed; and providing, by said content server, said chargeable service to said terminal.

4. The Internet billing method as claimed in claim 3, wherein said password is input to said terminal by a user instead of from said prepaid information medium.

5. A method, in an Internet billing system which makes billing on the Internet possible, in which system at least one terminal, at least one content server and at least one prepaid information management server are connected to a network, for controlling said terminal, said method comprising the steps of:

accessing said content server on the basis of address information stored in a prepaid information medium which has predetermined information necessary for transactions, and making a request for a service menu;

making a request of said content server for a chargeable service;

sending, upon receipt of a request from said prepaid information management server, an ID stored in said prepaid information medium to said prepaid information management server;

receiving information for authentication from said prepaid information management server, reading out a password stored in said prepaid information medium, performing a predetermined operation for a concatenated value of said information for authentication and the password, and sending a result of the operation to said prepaid information management server;

writing information including a balance of said prepaid information medium to said prepaid information medium on the basis of notification from said prepaid information management server; and wherein said prepaid information management server performs the same operation as performed in said terminal of the concatenated value of said information for authentication and said password, which password is stored in a database, and authenticating said prepaid information medium by verifying a result of the operation against the result sent from said terminal.

6. A method, in an Internet billing system which makes billing on the Internet possible, in which system at least one terminal, at least one content server and at least one prepaid information management server are connected to a network, for controlling said content server, said method comprising the steps of:

receiving a request for a service menu from said terminal on the basis of address information stored in a prepaid information medium which has predetermined information necessary for transactions, and sending the service menu to said terminal;

receiving a request for a chargeable service from said terminal;

making a request of said prepaid information management server for authentication of the prepaid information medium by sending a message which includes an address of said terminal to said prepaid information management server, and for billing for said prepaid information medium by sending a number of points necessary for the chargeable service;

providing said chargeable service to said terminal if both the authentication and billing succeed;

wherein, after the step of making a request of said prepaid information management server for authentication, said prepaid information management server makes a request of said terminal to send an ID stored in said prepaid information medium;

said terminal sending said ID to said prepaid information management server;

said prepaid information management server sending information for authentication to said terminal;

said terminal performing a predetermined operation for a concatenated value of said information for authentication and a password which is read from said prepaid information medium, and sending a result of the operation to said prepaid information management server; and said prepaid information management server performing the same operation as performed in said terminal of the concatenated value of said information for authentication and said password, which password is stored in a database, and authenticating said prepaid information medium by verifying a result of the operation against the result sent from said terminal.

7. A method, in an Internet billing system which makes billing on the Internet possible, in which system at least one terminal, at least one content server and at least one prepaid information management server are connected to a network, for controlling said prepaid information management server, said method comprising the steps of:

receiving a request for authentication of a prepaid information medium, used at said terminal, which the prepaid information medium has predetermined information necessary for transactions, and for billing for said prepaid information medium;

making a request for an ID stored in said prepaid information medium, and receiving the ID;

sending information for authentication to said terminal, wherein said terminal performs a predetermined operation for a concatenated value of said information for authentication and a password and sends a result of the operation to said prepaid information management server;

receiving the result of the operation performed by said terminal;

performing the same operation as performed in said terminal by referring to a database which stores prepaid information, and authenticating said prepaid information medium by verifying a result of the operation against the result sent from said terminal;

decrementing a balance of said prepaid information medium by necessary points if the authentication succeeds; and notifying said terminal of information which includes the decremented balance of said prepaid information medium.

8. An Internet billing system which makes billing on the Internet possible, said Internet billing system comprising at least one terminal, at least one content server and at least one prepaid information management server which are connected to a network, wherein said terminal comprises:
means for making a request of said content server for a chargeable service by using a prepaid information medium;

wherein said content server comprises:
means for making a request of said prepaid information management server for authentication to check whether said prepaid information medium is authorized to be used for said chargeable service;
means for making a request of said prepaid information management server for billing for said prepaid information medium; and
means for providing said chargeable service to said terminal; and wherein said prepaid information management server comprises:
means for authenticating said prepaid information medium; and
means for performing the billing for said prepaid information medium on the basis of usage of said chargeable service;

wherein, when authenticating said prepaid information medium, said prepaid information management server makes a request of said terminal to send an ID stored in said prepaid information medium;

said terminal sending said ID to said prepaid information management server;

said prepaid information management server sending information for authentication to said terminal;

said terminal performing a predetermined operation for a concatenated value of said information for authentication and a password which is read from said prepaid information medium, and sending a result of the operation to said prepaid information management server; and said prepaid information management server performing the same operation as performed in said terminal of the concatenating value of said information for authentication and said password, which password is stored in a database, and authenticating said prepaid information medium by verifying a result of the operation against the result sent from said terminal.

9. An Internet billing system which makes billing on the Internet possible, said Internet billing system comprising at least one terminal, at least one content server and at least one prepaid information management server which are connected to a network, wherein said terminal comprises:
means for making a request of said content server for a chargeable service by using a prepaid information medium which has predetermined information necessary for transactions;
means for sending an ID stored in said prepaid information medium upon receipt of a request from said prepaid information management server;
means for reading out a password stored in said prepaid information medium on the basis of information for authentication received from said prepaid information management server, performing a predetermined operation and sending a result of the operation to said prepaid information management server; and
means for writing information including a balance of said prepaid information medium to said prepaid information medium on the basis of notification from said prepaid information management server;

wherein said content server comprises:
means for making a request of said prepaid information management server for authentication to check whether said prepaid information medium is authorized to be used for said chargeable service;
means for making a request of said prepaid information management server for billing for said prepaid information medium; and
means for providing said chargeable service to said terminal if both authentication and billing succeed; and wherein said prepaid information management server comprises:
means for authenticating said prepaid information medium at said terminal upon receipt of a request for authentication from said content server;
means for performing the billing on the basis of usage of said chargeable service; and
means for notifying said terminal of information including a balance of said prepaid information medium.

10. An article of manufacture comprising a computer usable medium having computer-readable code means embodied therein for causing, in an Internet billing system which makes billing on the Internet possible, in which system at least one terminal, at least one content server and at least one prepaid information management server are connected to a network, a computer to control said terminal, the computer readable code means comprising:

computer-readable program code means for accessing said content server on the basis of address information stored in a prepaid information medium which has predetermined information necessary for transactions, and making a request for a service menu;

computer-readable program code means for making a request of said content server for a chargeable service;

computer-readable program code means for sending, upon receipt of a request from said prepaid information management server, an ID stored in said prepaid information medium to said prepaid information management server;

computer-readable program code means for receiving information for authentication from said prepaid information management server, reading out a password stored in said prepaid information medium, performing a predetermined operation for a concatenated value of said information for authentication and the password, and sending a result of the operation to said prepaid information management server;

computer-readable program code means for writing information including a balance of said prepaid information medium to said prepaid information medium on the basis of notification from said prepaid information management server; and wherein said prepaid information management server performs the same operation as performed in said terminal of the concatenating value of said information for authentication and said password, which password is stored in a database, and authenticating said prepaid information medium by verifying a result of the operation against the result sent from said terminal.

11. An article of manufacture comprising a computer usable medium having computer-readable code means embodied therein for causing, in an Internet billing system which makes billing on the Internet possible, in which system at least one terminal, at least one content server and at least one prepaid information management server are connected to a network, a computer to control said content server, the computer readable code means comprising:

- computer-readable program code means for receiving a request for a service menu sent from said terminal on the basis of address information stored in a prepaid information medium which has predetermined information necessary for transactions, and sending the service menu to said terminal;
- computer-readable program code means for receiving a request for a chargeable service from said terminal;
- computer-readable program code means for making a request of said prepaid information management server for authentication of the prepaid information medium by sending a message which includes an address of said terminal to said prepaid information management server;
- computer-readable program code means for billing for said prepaid information medium by sending a point number necessary for said chargeable service; and
- computer-readable program code means for providing said terminal with said chargeable service if both authentication and billing succeed;
- wherein, after making a request of said prepaid information management server for authentication by said content server, said prepaid information management server makes a request of said terminal to send an ID stored in said prepaid information medium;
- said terminal sending said ID to said prepaid information management server;
- said prepaid information management server sending information for authentication to said terminal;
- said terminal performing a predetermined operation for a concatenated value of said information for authentication and a password which is read from said prepaid information medium, and sending a result of the operation to said prepaid information management server; and
- said prepaid information management server performing the same operation as performed in said terminal of the concatenating value of said information for authentication and said password, which password is stored in a database, and authenticating said prepaid information medium by verifying a result of the operation against the result sent from said terminal.

12. An article of manufacture comprising a computer usable medium having computer-readable code means embodied therein for causing, in an Internet billing system which makes billing on the Internet possible, in which system at least one terminal, at least one content server and at least one prepaid information management server are connected to a network, a computer to control said prepaid information management server, the computer readable code means comprising:

- computer-readable program code means for receiving a request for authentication of a prepaid information medium, used at said terminal, which prepaid information medium has predetermined information necessary for transactions, and for billing for said prepaid information medium;
- computer-readable program code means for making a request for an ID stored in said prepaid information medium, and receiving the ID;
- computer-readable program code means for sending information for authentication to said terminal, wherein said terminal performs a predetermined operation for a concatenated value of said information for authentication and a password and sends a result of the operation to said prepaid information management server;
- computer-readable program code means for receiving the result of the operation performed by said terminal;
- computer-readable program code means for performing the same operation as performed in said terminal by referring to a database which stores prepaid information, and authenticating said prepaid information medium by verifying a result of the operation against the result sent from said terminal;
- computer-readable program code means for decrementing a balance of said prepaid information medium by necessary points if the authentication succeeds; and
- computer-readable program code means for notifying said terminal of information which includes the decremented balance of said prepaid information medium.

13. An IC card, in an Internet billing system which makes billing on the Internet possible, in which system at least one terminal, at least one content server and at least one prepaid information management server are connected to a network, comprising:

- means for connecting to said terminal;
- means for reading predetermined information stored in said IC card, which includes a password, necessary for transactions;
- means for retrieving information on authentication of said IC card from said prepaid information management server; and
- means for performing a predetermined operation on the password and the retrieved information, sending a result of the operation to said prepaid information management server;
- means for writing information including a balance of said IC card to said IC card on the basis of notification from said prepaid information management server; and
- wherein said prepaid information management server performs the same operation as performed in said IC card for providing a concatenating value of said information for authentication and said password, which password is stored in a database, and authenticating said IC card by verifying a result of the operation against the result sent from said terminal.

* * * * *